US010322543B2

(12) United States Patent
Ooba et al.

(10) Patent No.: US 10,322,543 B2
(45) Date of Patent: Jun. 18, 2019

(54) THREE-DIMENSIONAL MOLDING DEVICE

(71) Applicants: CMET INC., Yokohama-shi, Kanagawa (JP); National Institute of Advanced Industrial Science and Technology, Tokyo (JP)

(72) Inventors: Yoshikazu Ooba, Yokohama (JP); Yousuke Katou, Yokohama (JP); Koukichi Suzuki, Yokohama (JP); Yuya Daicho, Yokohama (JP); Hideaki Miyano, Yokohama (JP); Toshimitsu Okane, Tsukuba (JP); Satoshi Imamura, Tsukuba (JP); Satoshi Kajino, Tsukuba (JP)

(73) Assignees: CMET Inc., Kanagawa (JP); National Institute of Advanced Industrial Science and Technology, Tokyo (JP)

( * ) Notice: Subject to any disclaimer, the term of this patent is extended or adjusted under 35 U.S.C. 154(b) by 202 days.

(21) Appl. No.: 15/300,934

(22) PCT Filed: Mar. 19, 2015

(86) PCT No.: PCT/JP2015/058244
§ 371 (c)(1),
(2) Date: Sep. 30, 2016

(87) PCT Pub. No.: WO2015/151832
PCT Pub. Date: Oct. 8, 2015

(65) Prior Publication Data
US 2017/0021564 A1 Jan. 26, 2017

(30) Foreign Application Priority Data
Mar. 31, 2014 (JP) .................................. 2014-073293

(51) Int. Cl.
*B29C 64/00* (2017.01)
*B29C 64/165* (2017.01)
(Continued)

(52) U.S. Cl.
CPC ............ *B29C 64/165* (2017.08); *B28B 1/001* (2013.01); *B29C 64/205* (2017.08); *B29C 64/209* (2017.08); *B33Y 30/00* (2014.12)

(58) Field of Classification Search
CPC ....... B29C 64/165; B29C 64/10; B29C 64/20; B29C 64/30; B33Y 30/00; B33Y 40/00; B28B 1/001
See application file for complete search history.

(56) References Cited

U.S. PATENT DOCUMENTS 6,799,959 B1   10/2004   Tochimoto
7,887,316 B2   2/2011    Cox
(Continued)

FOREIGN PATENT DOCUMENTS

CN   103658646 A   3/2014
EP   1296789 A1   4/2003
(Continued)

OTHER PUBLICATIONS

International Search Report and Written Opinion for International Application No. PCT/JP2015/058244, dated Jun. 9, 2015.
(Continued)

*Primary Examiner* — Nahida Sultana
(74) *Attorney, Agent, or Firm* — RatnerPrestia

(57) ABSTRACT

The present invention provides a three-dimensional molding device which makes it possible to reduce molding time by decreasing the inkjet head waiting time during the molding step. A three-dimensional molding device for scattering and layering sand on a molding table (30) using a recoater (2), discharging a binder from a head (1) so as to coat the top of
(Continued)

the scattered sand with the binder, on the basis of molding data, and creating a three-dimensionally molded article by joining the sand (S) using the binder, wherein: the recoater (2) is formed so as to have an amount of sand (S) equivalent to the length of one side of the molding table (30) as the scatterable length thereof, and be capable of moving in a direction perpendicular to the one side; the head (1) is formed as a line head capable of discharging an amount of the binder equivalent to the length of a side adjacent to the one side, and so as to be capable of moving in a direction perpendicular to the side adjacent to the one side; and the three-dimensionally molded article is formed on the molding table (30) by alternatingly operating the recoater (2) and the head (1).

4 Claims, 12 Drawing Sheets

(51) Int. Cl.
*B28B 1/00* (2006.01)
*B33Y 30/00* (2015.01)
*B29C 64/209* (2017.01)
*B29C 64/205* (2017.01)

(56) References Cited

U.S. PATENT DOCUMENTS

| | | | |
|---|---|---|---|
| 8,926,484 B1* | 1/2015 | Comb | B23Q 3/155 425/162 |
| 2005/0001356 A1 | 1/2005 | Tochimoto et al. | |
| 2010/0214333 A1 | 8/2010 | Matsui et al. | |
| 2012/0156516 A1* | 6/2012 | Matsui | B29C 64/165 428/515 |
| 2015/0054204 A1* | 2/2015 | Tseliakhovich | B29C 67/0077 264/489 |
| 2015/0069659 A1* | 3/2015 | Hartmann | B29C 67/0085 264/308 |
| 2015/0130101 A1* | 5/2015 | Fiegener | B33Y 10/00 264/40.4 |
| 2015/0217519 A1* | 8/2015 | Otten | B29C 67/0088 264/40.1 |
| 2016/0368214 A1* | 12/2016 | Sasaki | B29C 67/0081 |
| 2018/0043616 A1* | 2/2018 | Ikeyama | B33Y 10/00 |

FOREIGN PATENT DOCUMENTS

| | | |
|---|---|---|
| JP | 2001150556 | 6/2001 |
| JP | 2006248231 | 9/2006 |
| JP | 2006205456 | 10/2006 |
| JP | 2009101651 | 5/2009 |
| JP | 2012131094 | 7/2012 |
| JP | 2015066872 | 4/2015 |
| WO | 0196048 A1 | 12/2001 |
| WO | 2015106832 A1 | 7/2015 |

OTHER PUBLICATIONS

Notification of Reasons for Refusal for Japanese Application No. 2016-511529, dated Apr. 2, 2019, with translation, 5 pages.

* cited by examiner (a)

(b)

(c)

(a) RETRACTED POSITION (b) HEAD MOVEMENT (c) RECOATER MOVEMENT (a)

(b)

(a)

(b)

(a)

(b)

(c)

THREE-DIMENSIONAL MOLDING DEVICE

CROSS-REFERENCE TO RELATED APPLICATIONS

This is the U.S. National Phase application of PCT/JP2015/058244, filed Mar. 19, 2015, which claims priority to Japanese Patent Application No. 2014-073293, filed Mar. 31, 2014, the disclosures of each of these applications being incorporated herein by reference in their entireties for all purposes.

TECHNICAL FIELD

The present invention relates to a 3D printer for printing a 3D object using a powder material and a binder of the powder material, more particularly relates to arrangement of a recoater depositing sand required for printing and an ink jet head coating a binder on the sand.

BACKGROUND ART

In recent years, 3D printers in which 3D design data is input to form three-dimensional objects (3D objects) in a printing-like manner have been commercialized. In the low price range (US$10,000 or less) mass market models, molten resin is deposited on a fabrication table from nozzles to form a thin layer and the thin layers are stacked to print a 3D object. The height per thin layer is about 0.2 mm. Mass market models are suitable for making toys etc.

On the other hand, to print 3D objects requiring high precision, middle price range medium grade models costing tens of thousands of U.S. dollars are necessary. Among medium grade models, there are ones which eject particles of resin to form layers for printing, Compared with mass market models which print by forming layers of molten resin, the surface finish becomes smoother. Further, among the medium grade models, there are ones which combine a number of types of materials to fabricate a 3D object. It is possible to form 3D objects with colors or 3D objects with transparent outside parts enabling the inside structure to be seen. Such medium grade models are suitable for fabricating prototypes meant for verifying the functions of the parts and for fabricating presentation use models.

Furthermore, high price range high grade models costing hundreds of thousands of U.S. dollars to a million U.S. dollars are designed for the manufacturing industry and enable fabrication of objects close to the final products. Therefore, high grade models are suitable for use in final checks of products, marketing, market surveys, etc. Further, among the 3D printers classed as high grade models, there are ones able to produce sand molds used for mass production of castings.

A 3D printer for producing sand molds is provided with a recoater able to store sand inside it and deposit sand from the tip in lines and an ink jet head. coating a binder on the sand thinly and uniformly deposited by the recoater on the printing table. In a 3D printer for producing sand molds, a layer of sand is thinly and uniformly deposited on a printing table, a binder is discharged and coated to solidify it, and these are stacked to form an object, then the object is calcined. A system for producing 3D objects from powder is disclosed in PLT 1.

CITATION LIST

Patent Literature

PLT 1: Japanese Patent Publication No, 2006-248231A

SUMMARY OF INVENTION

Technical Problem in this regard, in conventional 3D printers for producing sand molds, the recoater and ink jet head were designed to move in the same direction with respect to the printing table, so there was the problem that printing took time. That is, in the past, an operation where the recoater deposited the sand from one end toward the other end of the printing table and returned to the original position, then the ink jet head discharged and coated binder on the sand was repeated. There was a wait time at the ink jet head until the recoater returned to the original position.

The present invention has as its object to reevaluate the operations of the recoater and ink jet head at conventional 3D printers for producing sand molds and provide a 3D printer reducing the wait time of the ink jet head in the process of forming layers of sand and thereby shortening the printing time.

Solution to Problem

According to one aspect of the present invention, there is provided a 3D printer using a recoater to deposit a powder material on a printing table to form layers and using printing data as the basis to discharge and coat a binder on the deposited powder material from an ink at head and binding the powder material to create a 3D object, which 3D printer makes the recoater a length enabling deposition of powder material in an amount of the length of one side of the printing table and forming it to be able to move in a direction perpendicular to the one side and forms the ink let head as a line head able to discharge and coat binder in an amount of the length of aside adjoining the one side and forming it to be able to move in a direction perpendicular to the side adjoining the one side.

According to a second aspect of the present invention, there is provided a 3D printer using a recoater to deposit a powder material on a printing table to form layers and using printing data as the basis to discharge and coat a binder on the deposited powder material from an ink jet head and binding the powder material to create a 3D object, which 3D printer makes the recoater a length enabling deposition of powder material in an amount of the length of one side of the printing table and forming it to be able to move in a direction perpendicular to the one side, forms the ink jet head as a serial head able to freely move in longitudinal and lateral directions of the printing table to discharge and coat binder and forming it to be able to also move outside the path of movement of the recoater, and in the middle of the operation where the recoater moves in a direction perpendicular to the one side and deposits powder material on the printing table, the ink jet head is made to follow the recoater to discharge and coat binder on the powder material deposited by the recoater.

Advantageous Effects of Invention

According to the 3D printer of the present invention, it is possible to discharge and coat binder from the ink jet head on the sand deposited on the printing table without waiting for the return operation of the recoater depositing sand on the printing table, so there is the advantageous effect that it is possible to shorten the printing time.

BRIEF DESCRIPTION OF DRAWINGS

in FIG. 2(b) together with the printing tank and the elevator for raising and lowering the printing table.

FIG. 4(a) is a cross-sectional view along the line A-A of FIG. 3(f), FIG. 4(b) is a cross-sectional view along the line B-B of FIG. 4(a), FIG. 4(c) is a cross-sectional view along the line C-C of FIG. 4(a), FIG. 4(d) is a cross-sectional view along the line D-D of FIG. 4(a), FIG. 4(e) is a cross-sectional view along the line E-E, of FIG. 4(a), FIG. 4(f) is a cross-sectional view along the line F-F of FIG. 4(a), and. FIG. 4(g) is a cross-sectional view along the line G-G of FIG. 4(a).

FIG. 7(a) is a perspective view showing one example of a binder nozzle part of the ink jet head in the first embodiment of the 3D printer of the present invention, and. FIG. 7(b) is a perspective view showing another example of the binder nozzle part of the ink jet head in the first embodiment of the 3D printer of the present invention.

FIG. 8(a) is a perspective view when the ink let head and the recoater are in the retracted state, FIG. 8(b) is a perspective view showing the state where the recoater is depositing sand on the printing table, FIG. 8(c) is a perspective view showing the state where the binder is discharged and coated by the ink jet head on the sand deposited by the recoater.

DESCRIPTION OF EMBODIMENTS

Figure 1:
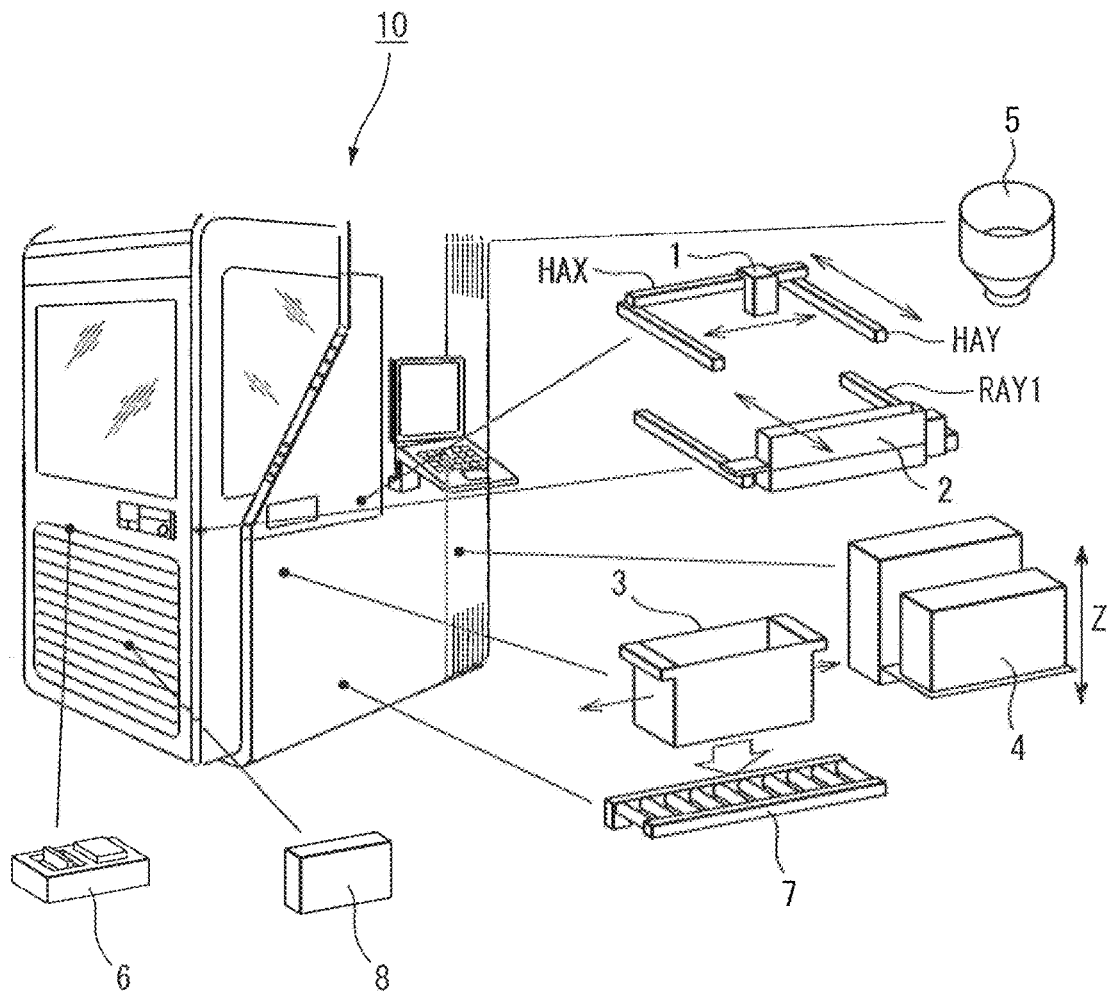
FIG. 1(a) is a perspective view showing members forming a general 3D printer.
FIG. 1(b) is a perspective view showing a column cast by a casting mold of a 3D object formed by the 3D printer shown in FIG. 1(a) as an example of a 3D object.
FIG. 1(c) is a perspective view showing one example of an 3D object formed in a printing tank for casting the column shown in FIG. 1(b).
Figure 1:
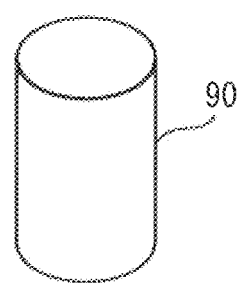
Figure 1:
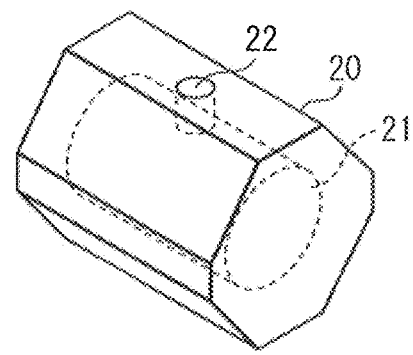

Below, attached drawings will be used to explain in detail embodiments of the present invention based on specific examples. Before explaining the embodiments of the present invention, FIGS. 1(a) to 1(c) to FIGS. 4(a) to 4(g) will be used to explain the structure and operation of the 3D printer using sand as the general powder material used up to now. Note that sand is an example. The printing tank of the 3D printer may be applied to other powder materials besides sand. Further, the structure of the 3D printer of the present invention may be the same as the structure of the 3D printer 10 shown in FIG. 1(a) except for the part of the movement mechanism of the ink jet head and the recoater explained later, so in the explanations of the examples of the present invention, the structure of the 3D printer other than the parts of the movement mechanism of the ink jet head and the recoater Will be omitted.

FIG. 1(a) shows the appearance of a general 3D printer 10 and members provided inside it taken out. The 3D printer 10 is a three-dimensional molding device. The 3D printer 10 includes an ink jet head 1, recoater 2, printing tank 3, elevator 4, sand feed hopper unit 5, cleaning unit 6, printing tank transport unit 7, chemical unit 8, etc. built in. Note that., after this, the ink jet head 1 will be simply referred to as the "head 1".

The head 1 can move to the front and back and to the left and right shown by the arrows by the head X-axis rail HAX and the head Y-axis rail HAY. Further, the head 1 discharges the adhesive for binding the sand, that is, the binder, based on the data obtained by converting the 3D data of the bit map, NC path data, etc. to a set of 2D layers, and coats the top of the printing table. The adhesive will be called the "binder" after this. Near the head 1, a recoater 2 is provided. The recoater 2 is provided with a recoater internal hopper and a vibrating blade (both not shown). The recoater internal hopper stores the sand to be fed from the sand feed hopper unit 5. Further, the vibrating blade operates when the recoater 2 moves in the front-back direction seen from the front surface of the device shown by the arrow by the recoater rails RAY1 and deposits the sand from the recoater 2 on the printing table densely and horizontally at the same thickness during movement.

The printing tank 3 holds the later explained printing table, on which a formed model (in the present invention, a 3D object) is completed. When the model is completed in the printing tank 3, the printing tank 3 is automatically rolled out from the 3D printer 10 by drive rollers of the printing tank transport unit 7. When the printing tank 3 is inserted into the 3D printer 10 as well, the drive rollers of the printing tank transport unit 7 are used to automatically insert the printing tank 3 inside the 3D printer 10.

The elevator 4 makes the printing table held in the printing tank 3 move in the Z-axial direction shown by the arrows. A generally used one can be used. Here, the explanation of the configuration is omitted. Further, the cleaning unit 6 removes excess binder, sand, etc. stuck to the head 1. The chemical unit 8 stores the chemicals (binder and cleaner) used for the printing process. The binder is fed to the head 1, while the cleaner is fed to the cleaning unit 6. Further, the chemical unit 8 has a waste liquor tank. Waste liquor generated at the cleaning unit 6 is recovered in this tank.

The movement of the recoater or head along the different axis rails can be performed by using a ball screw, by using a timing belt, by using an air slide cylinder using air pressure, or by any other known means. Similarly, for raising or lowering the printing table by the elevator, it is possible rouse a mechanism using a ball screw, a mechanism using a chain and gear, an air slide cylinder using air pressure, a hydraulic mechanism, or any other known mechanism.

In the 3D printer 10 shown in FIG. 1(a), it is possible to print a sand mold such as shown in FIG. 1(c) as a 3D object 20 for making a casting 90 such as shown in FIG. 1(b). The 3D object shown in FIG. 1(c) is provided with an inside space 21 for forming a casting 90 and a gate 22 as a communicating part for making molten iron flow into the inside space 21.

Here, a general example of the process for forming a 3D object using the head 1 and the recoater 2 in the printing tank 3 shown in FIG. 1(a) will be explained using FIGS. 2(a) to 2(d) to FIGS. 4(a) to 4(g). Note that, in this example, as a 3D object in which powder material is filled formed inside of the printing tank 3, the case of forming a casting mold for making a casting of the same shape as the casting 90 shown in FIG. 1(b) as a minimum extent 3D object will be explained.

Figure 2:
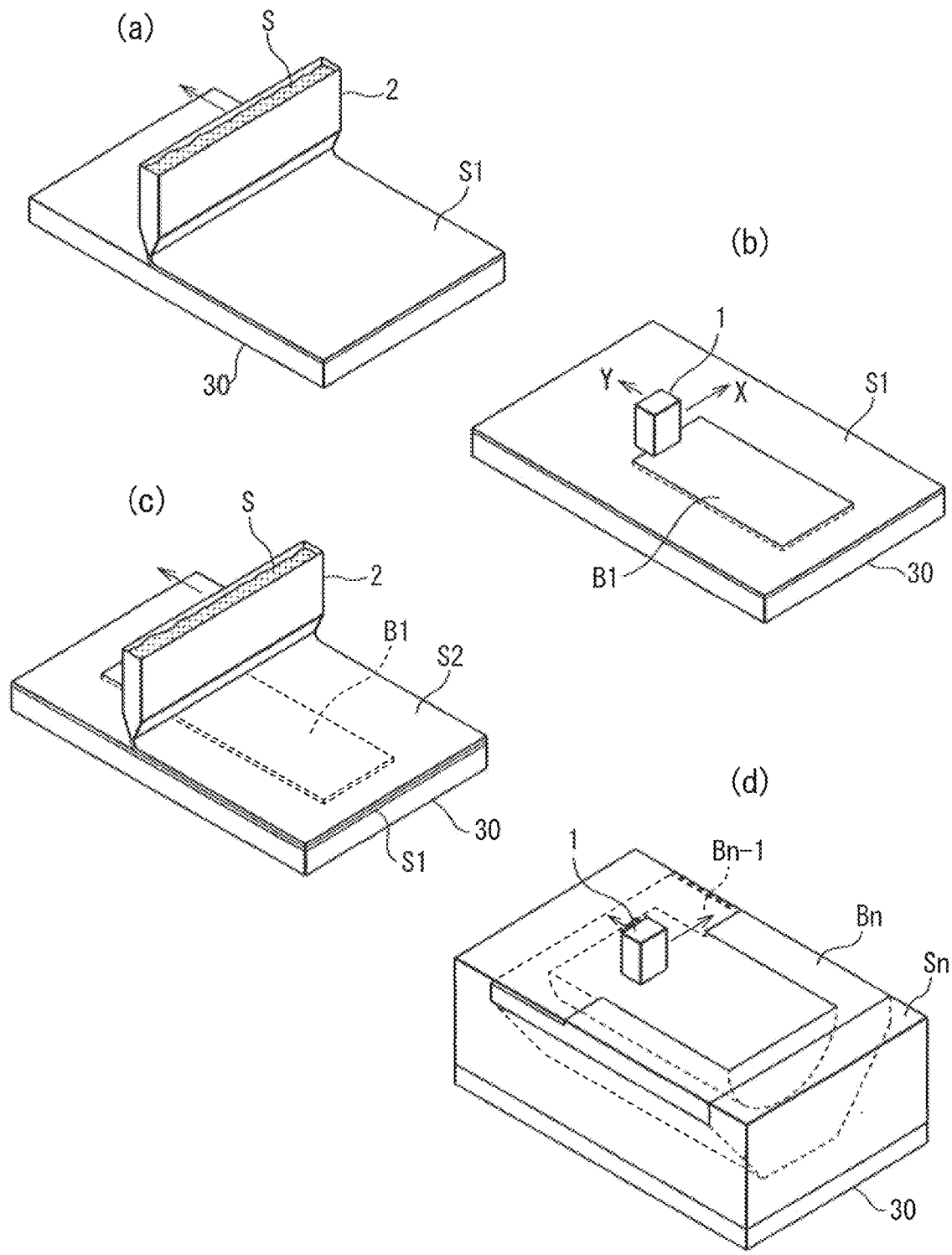
FIG. 2(a) is a perspective view showing a process where a first layer of sand is formed by a recoater on a printing table held in the printing tank shown in FIGS. 1(a) to 1(c)
FIG. 2(b) is a perspective view showing a process where a binder is discharged and coated by an ink jet head on the layer of sand formed on the printing table by the process of FIG. 2(a)
FIG. 2(c) is a perspective view showing a process where a second layer of sand is formed by the recoater on the first layer of sand shown in FIG. 2(b)
FIG. 2(d) is a perspective view showing a process where the binder is discharged and coated by the ink jet head on a layer of sand after layers of sand have been formed by the recoater and binder has been discharged and coated by the ink jet head over several layers.
Figure 3:
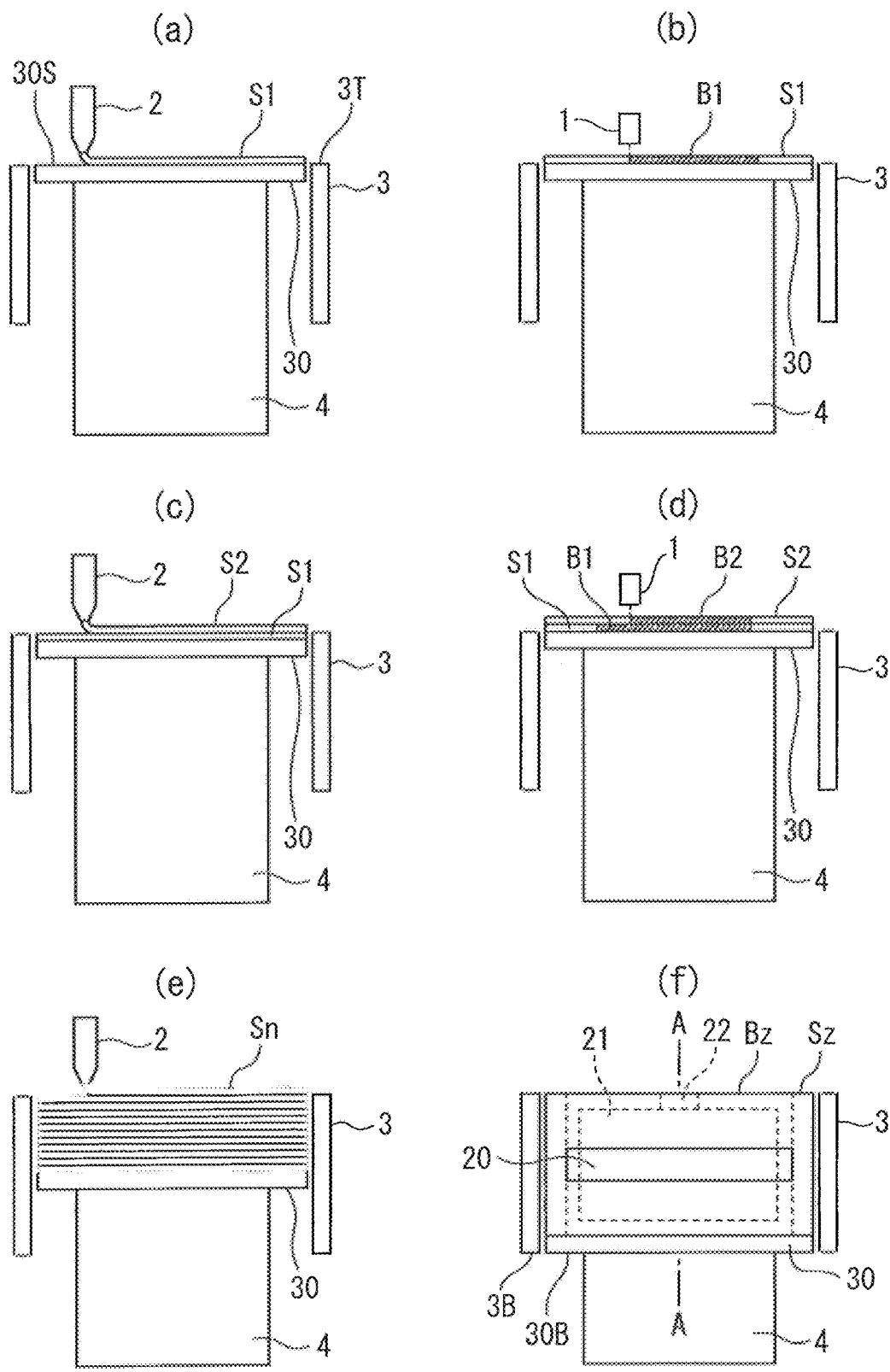
FIG. 3(a) is a cross-sectional view showing the state shown in FIG. 2(a) together with a printing tank and an elevator for raising and lowering the printing table.
FIG. 3(b) is a cross-sectional view showing the state shown.
FIG. 3(c) is a cross-sectional view showing the state shown in FIG. 2(c) together with the printing tank and the elevator for raising and lowering the printing table.
FIG. 3(d) is a cross-sectional view showing a process where the binder is discharged and coated by the in let head on the second layer of sand formed by the process of FIG. 3(c)
FIG. 3(e) is a cross-sectional view showing a state where several layers of sand. are formed on the printing table inside the printing tank.
FIG. 3(f) is a cross-sectional view showing the state where layers of sand are formed on the printing table in the printing tank up to the final layer and a hollow object is formed by the hinder in the layers of sand.

FIG. 2(a) and FIG. 3(a) show the process of the recoater 2 depositing sand S horizontally to form a first layer of sand S1 on the printing table 30 held in the printing tank 3 shown in FIG. 1(a). As shown in FIG. 3(a), in this example, at the time of starting the printing, the top surface 30S of the printing table 30 is a surface at the same height as the top end face 3T of the printing tank 3. Inside the recoater 2, sand S fed from the sand feed hopper unit 5 shown in FIG. 1(a) is contained. The recoater 2 moves along the recoater shafts RAY1 in the arrow direction and deposits this sand S on the top surface 30S of the printing table 30 to form a first layer of sand S1. The recoater 2 continuously moves from one end to the other end of the printing table 30 and thinly deposits sand S over the entire top surface 30S of the printing table 30. The recoater 2 having finished depositing sand S moves to the outside of the printing table 30 and stands by.

Figure 4:
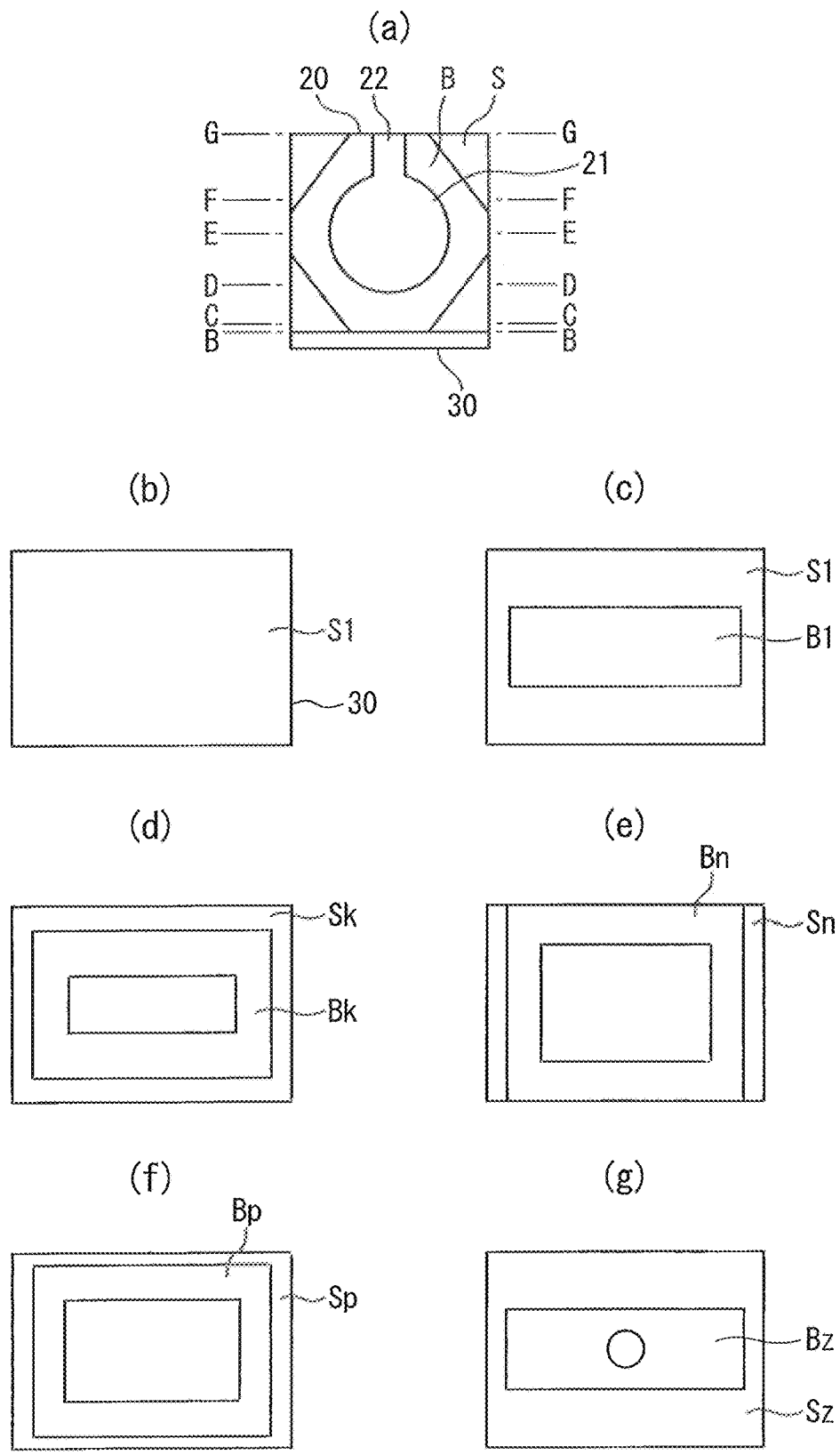

FIG. 4(b) shows the first layer of sand S1 formed on the printing table 30. The thickness of the layers of sand subsequently formed on the first layer of sand S1, including the thickness of the first layer of sand S1, is always constant. FIG. 2(b) and FIG. 3(b) show the process where the head 1 discharges and coats a binder on the first layer of sand S1 shown in FIG. 4(a). The head 1 can move to the front and back and to the left and right shown by the arrows by the head X-axis shaft HAX and the head Y-axis shafts HAY shown in FIG. 1(a). Specifically, the operation where the head 1 first moves in the X-direction and discharges and coats binder in accordance with the printing data, then moves in the Y-direction by the amount of one line and discharges and coats binder in the X-direct ion is repeated. At parts where the object is not present, that is, at parts with no printing data, the binder is not discharged.

Below the printing table 30, an elevator 4 is provided, but the elevator 4 does not operate when the head 1 is operated right after the recoater 2 finishes operating. The state where the discharge and coating of the binder from the head 1 to the first layer of sand. S1 end is shown in FIG. 4(c). If the discharge and coating of the binder to the top of the first layer of sand S1 end, the part E1 of the first layer of sand S1 coated with the binder solidifies. When the binder finishes being coated on the first layer of sand S1, the elevator 4 causes the printing table 30 to descend by exactly an. amount of the thickness of the first layer of sand S1. As a result, the top surface of the first layer of sand S1 becomes the same plane as the top end face 3T of the printing tank 3.

In this state, the head 1 and the recoater 2 return to their original positions, then, as shown in FIG. 2(c) and FIG. 3(c), a process is performed where sand S is deposited on the first layer of sand S1 coated with the binder from the recoater 2 moving in the direction shown by the arrow to form a second layer of sand S2. Due to the formation of the second layer of sand S2 by the recoater 2, the part B1 coated with the binder on the first layer of sand S1 is completely concealed by the sand S.

Next, as shown in FIG. 3(d), binder is discharged and coated by the head. 1 on the second layer of sand S2, then the part B2 of the second layer of sand S2 coated with the binder solidifies and is connected with the part B1 of the first layer of sand. S1 coated with the binder. Such deposition of layers of sand by the recoater 2 and discharge and coating of binder by the head 1 are repeatedly performed while the elevator 4 makes the printing table 30 descend by exactly the thickness of the sand layer. The shapes of the parts coated with the binder formed by the head 1 on the layers of sand differ depending on the shape of the 3D object formed. When, like in the present example, forming an object of the same shape as the sand mold shown in FIG. 1(c) as a hollow 3D object, the shapes of the parts coated with the binder on the layer of sand change such as shown in FIG. 4(c) to FIG. 4(g).

The state shown in FIG. 2(d) shows the state where about half of a hollow 3D object is formed in the printing tank 3. Further, the process of forming the n-th ("n" is a natural number) layer of sand Sn of the state shown in FIG. 4(e) is shown in FIG. 3(e) while the process of discharging and coating a binder on the layer of sand Sn to form a part Sn coated with binder is shown in FIG. 2(d), At this time, the printing table 30 descends to a position of about half of the depth of the printing tank 3 due to the elevator 4.

The state where the final layer of sand Sz is formed on the printing table 30 and a part Bz coated with binder is formed on the final layer of sand Sz is shown in FIG. 3(f) and FIG. 4(g). In this state, the bottom surface 30B of the printing table 30 descends to the position of the bottom end face 35 of the printing tank 3 by the elevator 4. Further, the cross-section along the line A-A of FIG. 3(f) is shown in FIG. 4(a). Further, from the cross-section shown in FIG. 4(a), it will be understood that the shapes of the parts coated with binder shown in FIG. 4(b) to FIG. 4(q) are respectively the shapes along the line B-B, line C-C, line D-D, line E-E, line F-F, and. line G-G in FIG. 4(a). Note that when the height of the 3D object formed on the printing table 30 is lower than the depth of printing tank 3, when the 3D printer finishes printing, sometimes the printing table 30 does not reach the bottom end part of the printing tank 3.

Figure 5:
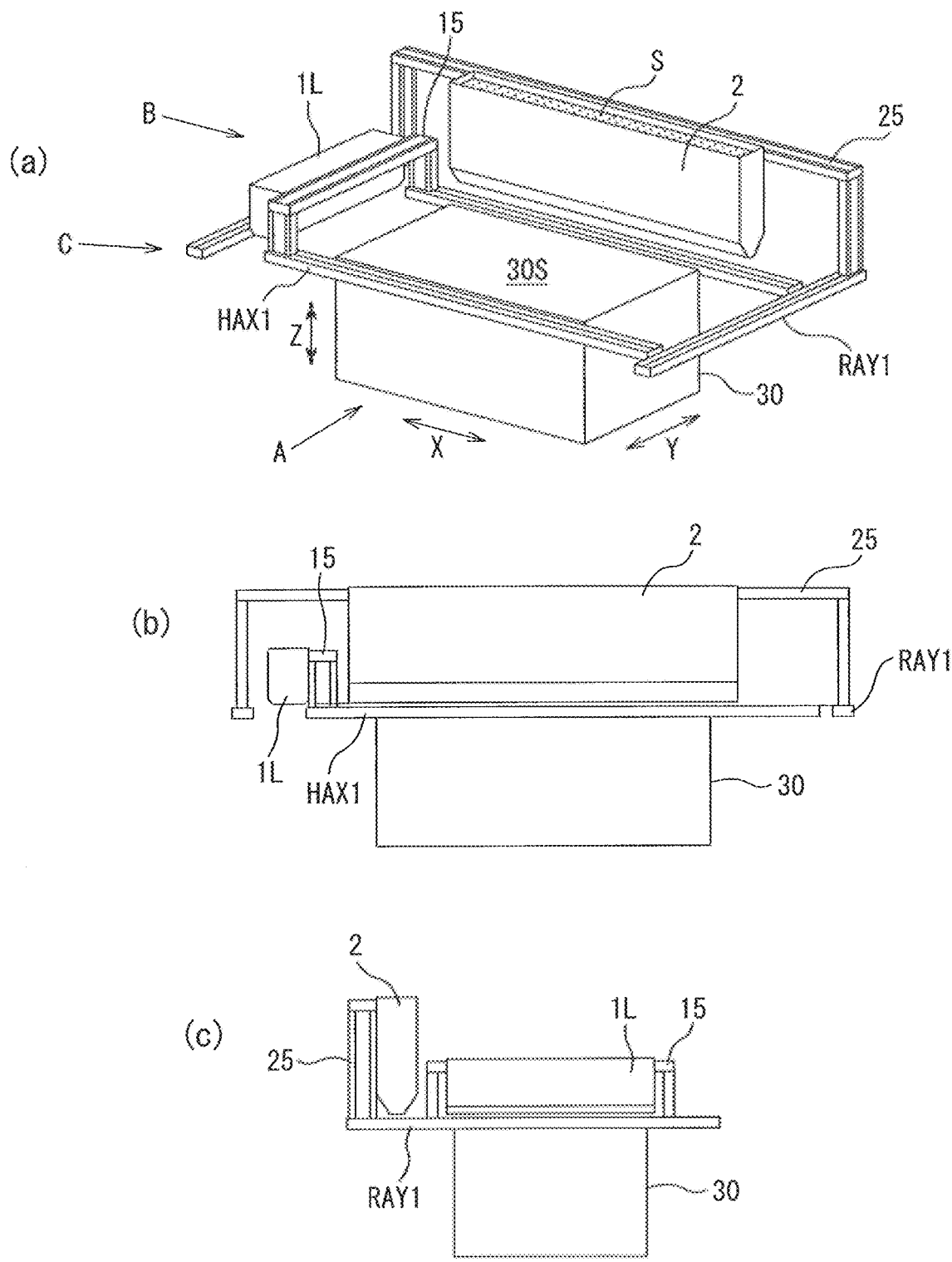
FIG. 5(a) is a perspective view showing a structure of a movement mechanism of the ink jet head and the recoater in the first embodiment of the 3D printer of the present invention.
FIG. 5(b) is an arrow view of the movement mechanism of the ink let head and the recoater shown in FIG. 5(a) as seen from the arrow A direction.
FIG. 5(c) is an arrow view of the movement mechanism of the ink jet head and the recoater shown in FIG. 4(a) as seen from the arrow B direction.

When the above explained process ends, a 3D object 20 such as shown in FIG. 3(f) is formed inside of the printing tank 3. At the top end face of the 3D object 20, a gate 22 forming a part communicating the inside and outside is formed. From this state, the elevator 4 is operated to place the printing tank 3 containing the printing table 30 and the 3D object 20 including sand layers above it on the printing tank transport unit 7 as shown in FIG. 5(a) and the tank is rolled out on the rollers 70 to withdraw it from the 3D printer. Further, as shown in FIG. 5(b), outside of the 3D printer, the printing tank 3 is pulled up thereby leaving the printing table 30 and the layers of sand and 3D object 20 formed on the same. When the sand layers are removed, a 3D object 20 such as shown in FIG. 1(c) is obtained.

As opposed to the structure and operation of the head 1 and the recoater 2 in the general 3D printer 10 explained above, the structure and operation of the head 1 and the recoater 2 in the 3D printer in the first embodiment of the present invention will be explained below. In the 3D printer of the present invention as well, component parts the same as the general 3D printer 10 explained using FIGS. 1(a) to 1(c) to FIGS. 4(a) to 4(g) will be explained assigned the same reference notations.

FIG. 5(a) shows the structure of the movement mechanism of the head (ink jet head) 1L and the recoater 2, and the relationship between the same and the printing table 30 in the first embodiment of the 3D printer of the present invention. The printing table 30, as explained above, is a single plate which ascends and descends inside the printing tank 3, but in the present embodiment, to clarify the position of the printing table 30 with the head 11, and the recoater 2, the thickness in. the height direction is drawn exaggerated. The recoater 2 is filled with sand S. Further, FIG. 5(b) is a view of the movement mechanism of the head 1L and the recoater 2 shown in FIG. 5(a) as seen from the arrow A direction, while FIG. 5(c) is a view of the movement mechanism of the head 1T, and the recoater 2 shown in FIG. 5(a) as seen from the arrow B direction. The other parts of the 3D printer of the present invention may be the same as the configuration of the general 3D printer 10 explained in. FIG. 1(a), so illustrations and explanations will be omitted.

In the first embodiment, two head X-axis rails HAX1 are provided in parallel to the direction of one side of the printing table 30 forming the 3D object on the top surface 30S (this designated as the X-direction). On the two head X-axis rails HAX1, a gate type frame 15 is attached to be able to move along the head X-axis rails HAX1. At the gate type frame 15, a head 11, provided with a length of a side adjoining that one side of the printing table 30 is attached. The head 1L is a line head. The structure of the head 11, will be explained later. Therefore, by the gate type frame 15 moving along the head. X-axis rails HAX1, the top surface 30S of the printing table 30 can be coated with a binder to shapes corresponding to the printing data.

In the direction of the side adjoining the afore-mentioned one side of the printing table 30 (this designated as the Y-direction), two recoater Y-axis rails RAY1 are provided at positions outside the two head X-axis rails HAX1. On the two recoater Y-axis rails RAY1, a gate type frame 25 is attached to be able to move along the recoater Y-axis rails RAY1. At the gate type frame 25, a recoater 2 provided with a length of one side of the printing table 30 is attached. For the recoater 2, one the same as the recoater 2 in the general 3D printer 10 explained in FIG. 1(a) can be used. By the gate type frame 25 moving along the recoater Y-axis rails RAY1, sand can be deposited to a uniform thickness over the entire top surface 30S of the printing table 30.

Figure 6:
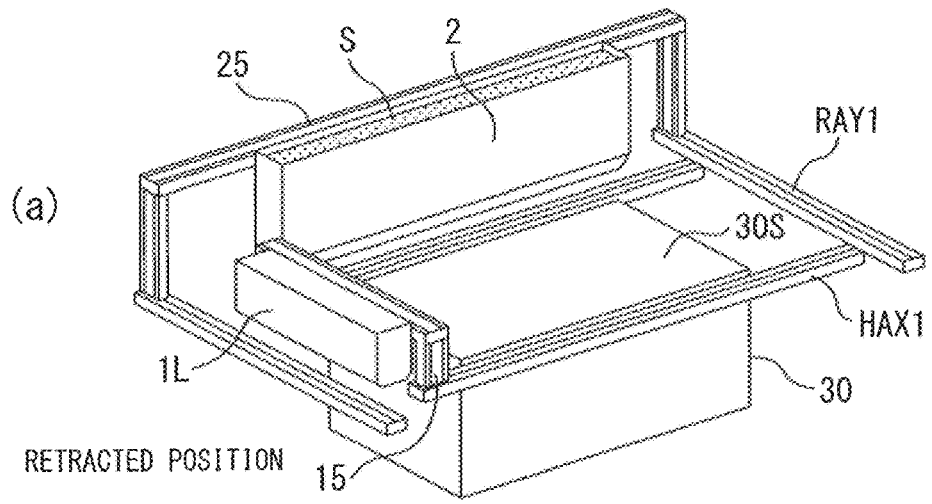
FIG. 6(a) is a perspective view of the movement mechanism of the ink jet head and the recoater shown in FIG. 5(a) as seen from the arrow C direction.
FIG. 6(b) is a perspective view showing the state of movement of the head from the state shown in FIG. 6(a)
FIG. 6(c) is a perspective view showing the state where the head finishes moving and the recoater moves from the state shown in FIG. 6(b).
Figure 6:
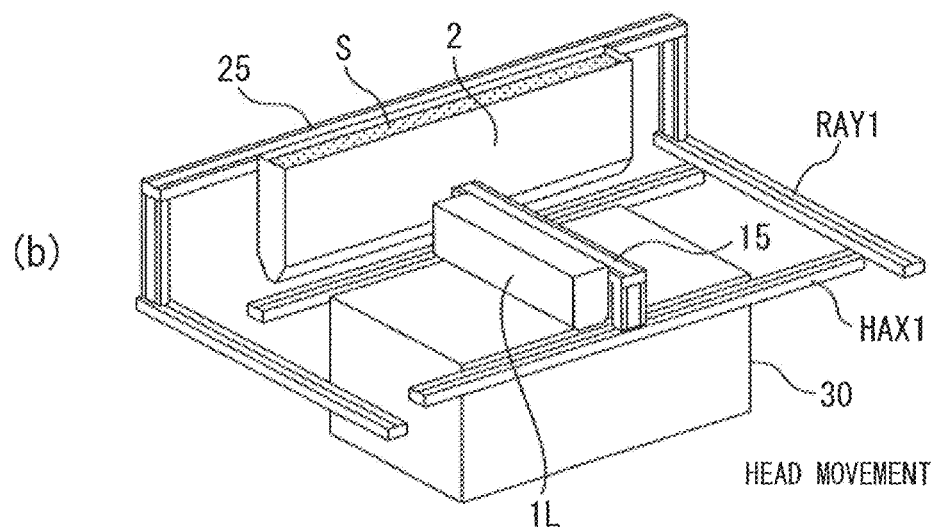
Figure 6:
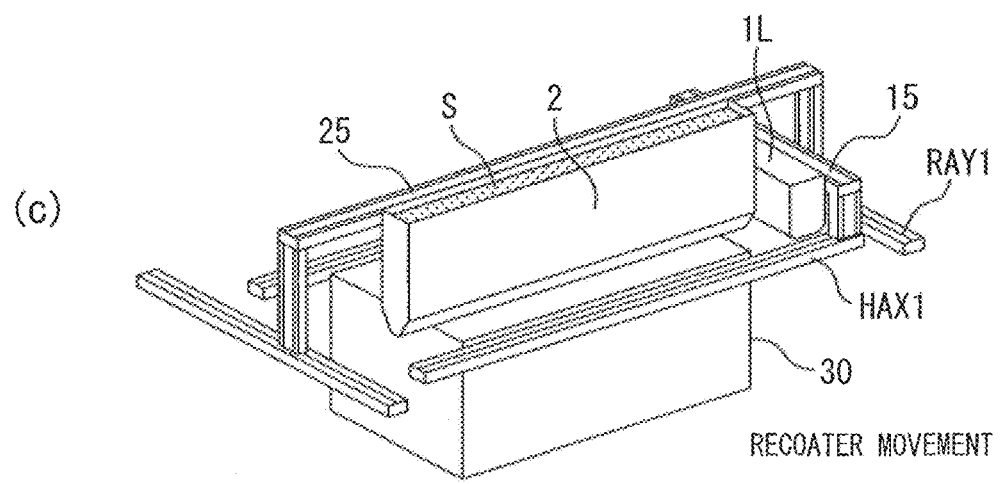

FIG. 6(a) is a view of a movement mechanism of the head 1L and the recoater 2 shown in FIG. 5(a) from the arrow C direction and shows the state where both the head 1L and the recoater 2 are in retracted positions away from the top surface 30S of the printing table 30. Further, FIG. 6(b) shows the state where the head 1L moves from the state shown in FIG. 6(a) and discharges and coats binder on the top surface 30S of the printing table 30. Furthermore, FIG. 6(c) shows the state where the head 1L has finished moving from the state shown in FIG. 6(b) and reaches the opposite side retracted position and in that state the recoater 2 moves and deposits sand S on the top surface 303 of the printing table 30. In the first embodiment, in this way, the head 1L and the recoater 2 operate one at a time. While one is operating, the other is in a retracted position. In both the forward and return directions, sand can be deposited on the top surface 305 of the printing table 30 and binder can be coated on that.

Figure 7:
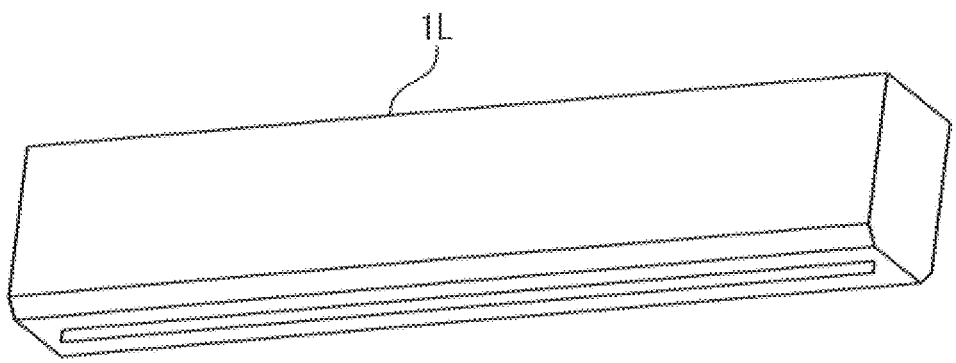
Figure 7:
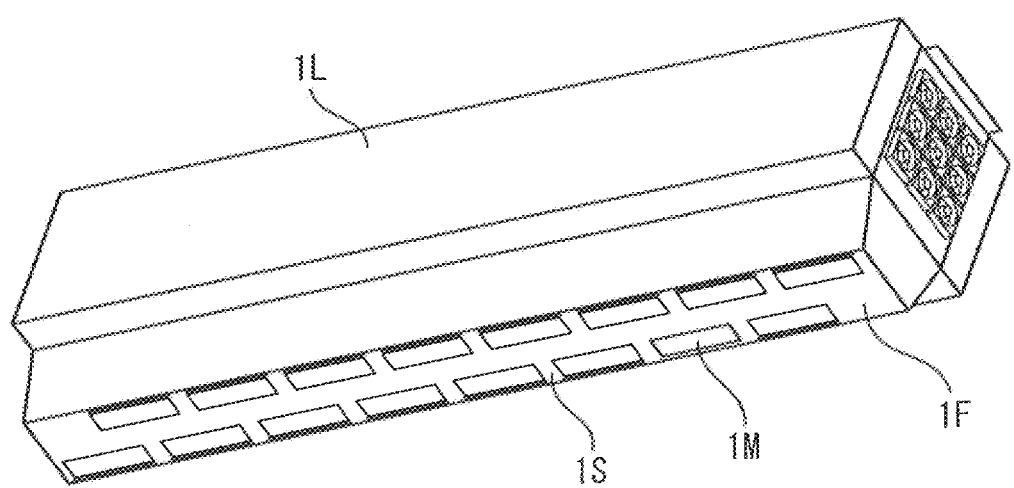

FIG. 7(a) shows one example of the structure of the head 1L in the first embodiment. At the face discharging the hinder, that is, the discharge face 1F of the head 1L a plurality of elongated nozzles 1N for binder discharge are provided arranged at a slant. The interval between the nozzles 1N is 1 mm to 0.05 mm or so and differs depending on the fineness sought from the formed 3D object. Further, FIG. 7(b) shows another example of the structure of the head 1L in the first embodiment. In this example, at the binder discharge face 1F of the head 1L, nozzle groups 1M each comprising a plurality of nozzles for binder discharge use (units of tens to hundreds) are provided aligned in two rows separated by predetermined spaces. The two rows of nozzle groups 1M are arranged so that the center parts of the nozzle groups 1M of one row face the space parts 1S of the other row. By arranging a plurality of nozzle groups 1M at the head 1L in this way, it is possible to combine commercially available ink jet heads and control the heads by software to simply realize a line ink jet head.

Figure 8:
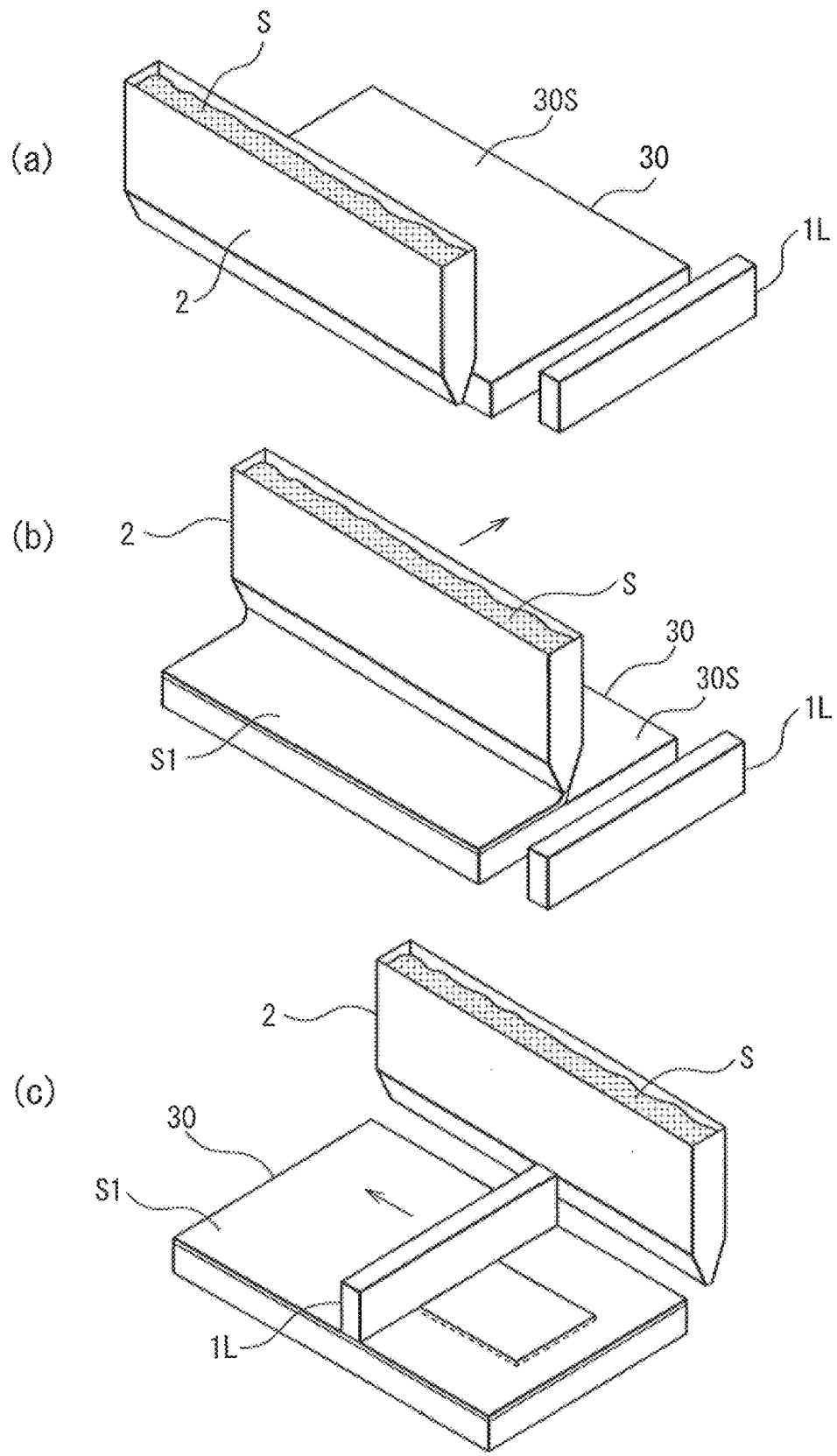
FIGS. 8(a) to 8(c) explain the operations of the ink jet head and recoater in the first embodiment of the 3D printer of the present invention.

FIG. 8(a) to FIG. 8(c) explain the operations of the head it and recoater 2 in the first embodiment. FIG. 8(a) shows the positions of the head it and the recoater 2 with respect to the printing table 30 when the head it and the recoater 2 are in retracted states. When forming a 3D object on the printing table 30, first, as shown in FIG. 8(b), the recoater 2 deposits sand S horizontally on the printing table 30 to form a first layer of sand S1. When the recoater 2 finishes depositing sand S on the printing table 30 and the first layer of sand S1 is formed, the recoater 2, as shown in FIG. 8(c), enters the opposite side retracted position from the retracted position shown in FIG. 8(a). This retracted position is a position where it will not interfere with the operation of the head it.

As shown in FIG. 8(c), if the recoater 2 finishes forming the first layer of sand S1 on the printing table 30 and enters a retracted position, the head 1L operates and binder is discharged and coated by the head 1L on the first layer of sand S1 deposited by the recoater 2. FIG. 8(c) shows a part coated with the binder by reference notation B1. The part B1 of the first layer of sand S1 coated with the binder solidifies. T1 the head 1L finishes discharging and coating the binder, the head 1L enters the retracted position at the opposite side of the retracted position shown in FIG. 8(a). This retracted position is a position where it will not Interfere with the operation of the recoater 2.

After this operation, using a not shown elevator, the printing table 30 descends by exactly the amount of thickness of the first layer of sand S1 and the top surface of the first layer of sand S1 becomes the same position as the position of the top surface 305 of the printing table 30 before depositing the sand S. After that, the recoater 2 moves toward the retracted position shown in FIG. 8(a) and deposits sand S on the printing table 30 to form a second layer of sand. When the sand depositing operation of the recoater 2 ends, the head 1L moves toward the retracted position shown in FIG. 8(a) and discharges and coats binder on the deposited sand.

After this, the sand depositing operation by the recoater 2, the discharge and coating operation by the head IL, and the adjustment of position by the elevator are repeatedly performed whereby a 3D object is formed on the printing table 30 in the same way as the general 3D printer 10 shown in FIG. 1(a), in the first embodiment, the head 1L is a line head. By the recoater 2 and head 1L moving in perpendicular directions, it is possible to form a 3D object on the printing table 30 in a short time.

FIG. 9(a) shows the structure of the movement mechanism of the head 1 and the recoater 2 in a second embodiment of the 3D printer of the present invention and shows the state where the head 1 and the recoater 2 are at retracted positions. In the second embodiment as well, the other parts besides the movement mechanism of the head 1 and the recoater 2 may be configured the same as the configuration of the general 3D printer 10 explained in FIG. 1(a), so illustrations and explanations will be omitted.

In the second embodiment, the direction of one side of the printing table 30 for forming the 3D object is designated as the X-direction and the direction of an adjoining side is designated as the Y-direction. In the second embodiment, two recoater Y-axis rails RAY1 are provided parallel to the Y-direction. The two recoater Y-axis rails RAY1 extend to the two sides of the printing table 30. The extended parts are bent downward at a slant, then are returned to a state parallel to the recoater Y-axis rails RAY1 whereby the offset rails RAY2 are formed. Between the two recoater Y-axis rails RAY1, a mounting bar 16 able to move along the recoater Y-axis rails RAY1 in the Y-direction is bridged. At the mounting bar 16, a recoater 2 provided with a length of one side of the printing table 30 is attached. For the recoater 2, one the same as the recoater 2 in the general 3D printer 10 explained in FIG. 1(a) can be used. By the mounting bar 16 moving along the recoater Y-axis rails RAY1, sand can be deposited to a uniform thickness over the entire top surface 30S of the printing table 30.

Above the two recoater Y-axis rails RAY1, two head Y-axis rails HAY1 are provided in parallel. The intervals between the two recoater Y-axis rails RAY1 and the two head Y-axis rails HAY1 are the same. The two head Y-axis rails HAY1 extend to the two sides of the printing table 30. The extended parts are bent upward at a slant, then are returned to a state parallel to the head Y-axis rails HAY1 whereby the offset rails HAY2A are formed. Between the two head Y-axis rails HAY1, a head X-axis rail HAX1 able to move along the head Y-axis rails HAY1 in the Y-direction is bridged. At the head X-axis rail HAX1, a head 1 is attached to be able to move in the X-direction. For the head 1, one the same as the head 1 in the general 3D printer 10 explained in FIG. 1(a) can be used.

The head X-axis rail HAX1 can move in the Y-direction along the head Y-axis rails HAY1 while the head 1 can move in the X-direction along the head X-axis rail HAX1. Due to this, the head 1 can freely move over the entire top surface 303 of the printing table 30 and discharge and coat binder. Further, due to the offset rails RAY2, the recoater 2 which had moved along the recoater Y-axis rails RAY1 can move below the printing table 30 at the outside of the printing table 30. Conversely due to the offset rails HAY2, the head 1 which had moved along the head Y-axis rails HAY1 can move above the printing table 30 at the outside of the printing table 30.

Further, as shown in FIG. 9(a), the head 1 positioned on the offset rails HAY2 and in the retracted. state and the recoater 2 positioned at the offset rails RAY2 and in the retracted state will not interfere with each other and can be positioned in the up-down direction. As opposed to this, in the section of the parallel head Y-axis rails HAY1 and recoater Y-axis rails RAY1, the head 1 and the recoater 2 interfere with each other and cannot be positioned in the up-down direction.

When forming a 3D object on the top surface 30S of the printing table 30, as shown in FIG. 9(b), the recoater 2 at the retracted position shown in FIG. 9(a) first moves along the forward path and deposits sand on the printing table 30. In the second embodiment, after the recoater 2 deposits a certain amount of sand on the printing table 30 and, as shown in FIG. 9(c), before the recoater 2 finishes depositing the sand, the head 1 moves following the recoater 2 and starts operating to discharge and coat binder on the sand deposited by the recoater 2.

Figure 11:
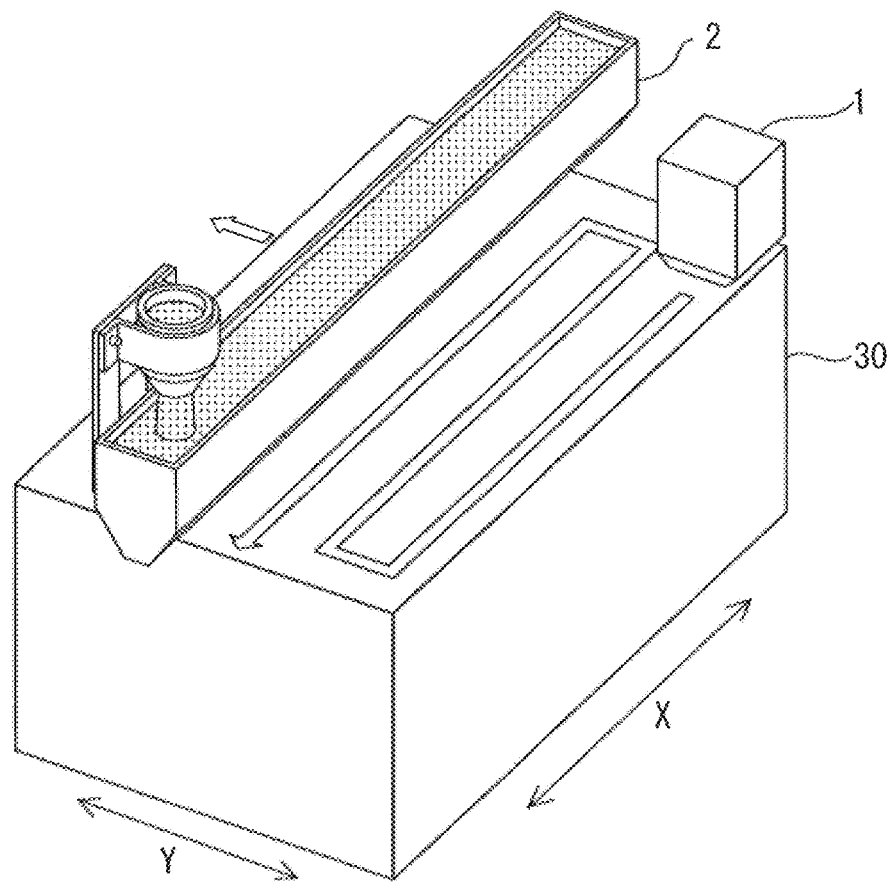
FIG. 11(a) is a partially enlarged perspective view showing the state where the recoater moves and deposits sand and the ink jet head follows the recoater and discharges and coats binder in the second embodiment of the 3D printer of the present in and FIG. 11(b) is a plan view of FIG. 11(a).
Figure 11:
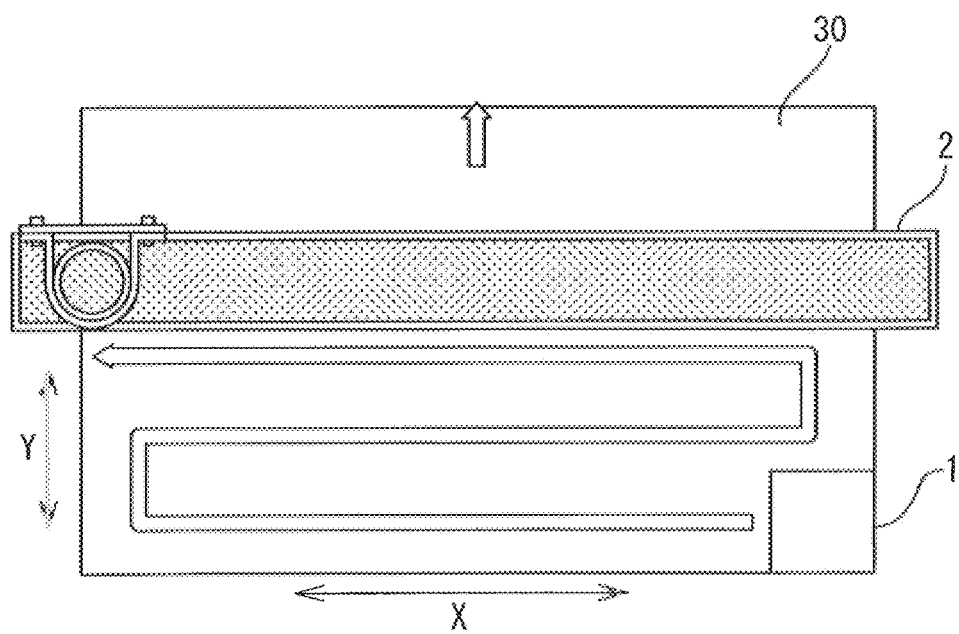

FIG. 11(*a*) shows the state in the second embodiment where right in the middle of the recoater 2 moving and depositing sand, the head 1 follows the recoater 2 and discharges and coats binder on the sand. Further, FIG. 11(*b*) shows by a plan view the state where the head 1 shown in FIG. 11(*a*) follows the recoater 2 and discharges and coats binder on the sand. The head 1 discharges and coats binder on the sand deposited by the recoater 2 moving in the Y-direction of the printing table 30. The operation where the head 1 first moves in the X-direction over the printing table 30 to discharge binder and coat the binder in the X-direction, then moves in the Y-direction and moves in the opposite direction to the X-direction to discharge and coat the binder is repeated. When the head 1 has only one binder nozzle, the head 1 moves in the Y-direction one line at a time, but when the head 1 is provided with a plurality of binder nozzles aligned in the Y-direction, the head 1 can be moved in the Y-direction a plurality of lines at a time.

Figure 9:
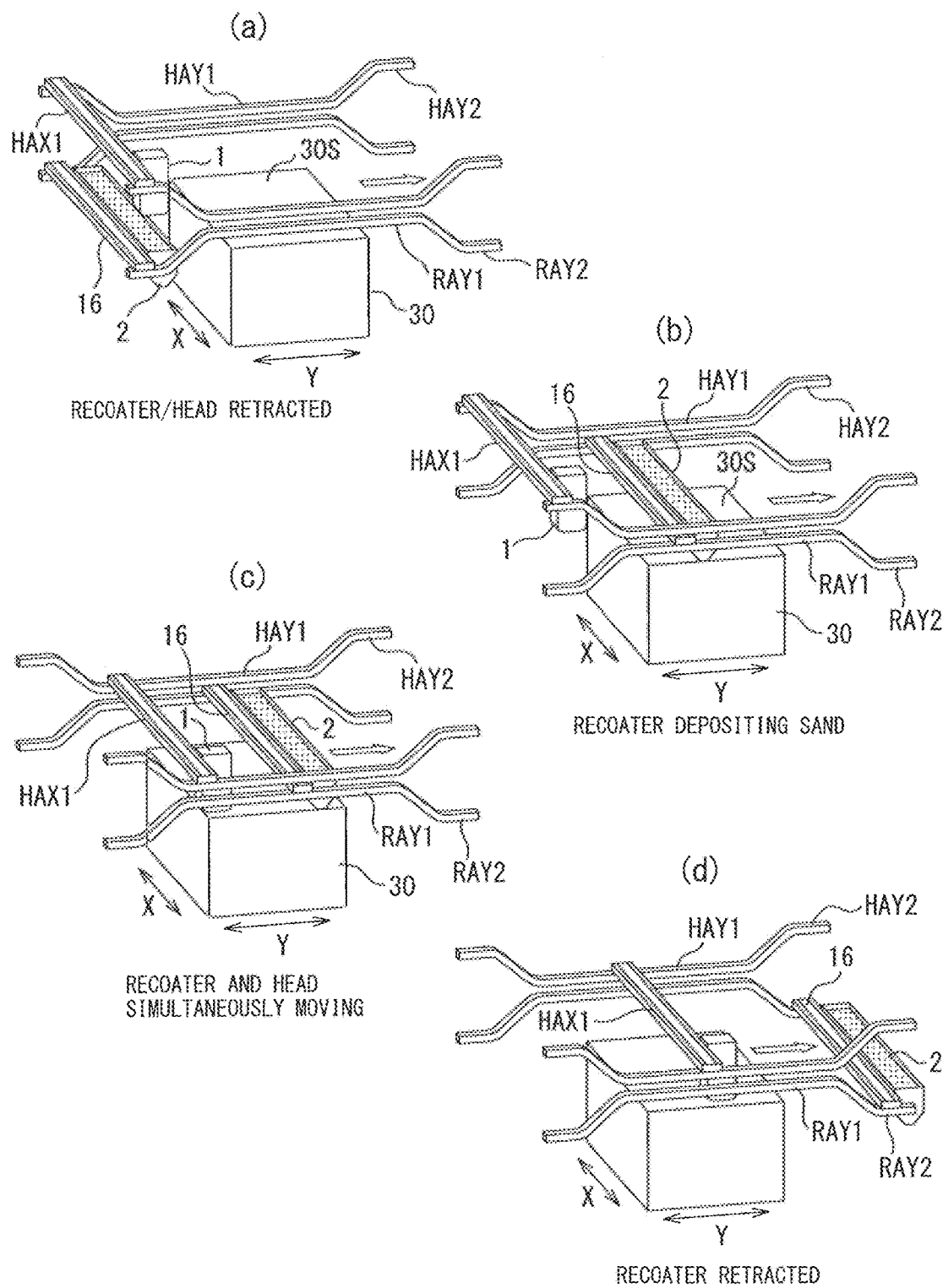
FIG. 9(a) is a perspective view showing the structure of the movement mechanism of the ink jet head and the recoater in a second embodiment of the 3D printer of the present invention and a view showing the state in which the ink let head and the recoater are in retracted. positions.
FIG. 9(b) is a perspective view showing the state where the recoater moves from the state shown in FIG. 9(a) and sand is being deposited.
FIG. 9(c) is a perspective view showing the state where the ink jet head operates following the recoater from the state shown in FIG. 9(b)
FIG. 9(d) is a perspective view showing the state where the recoater finishes the sand. depositing operation and enters a retracted position and where the ink jet head moves and discharges and coats the binder.
Figure 10:
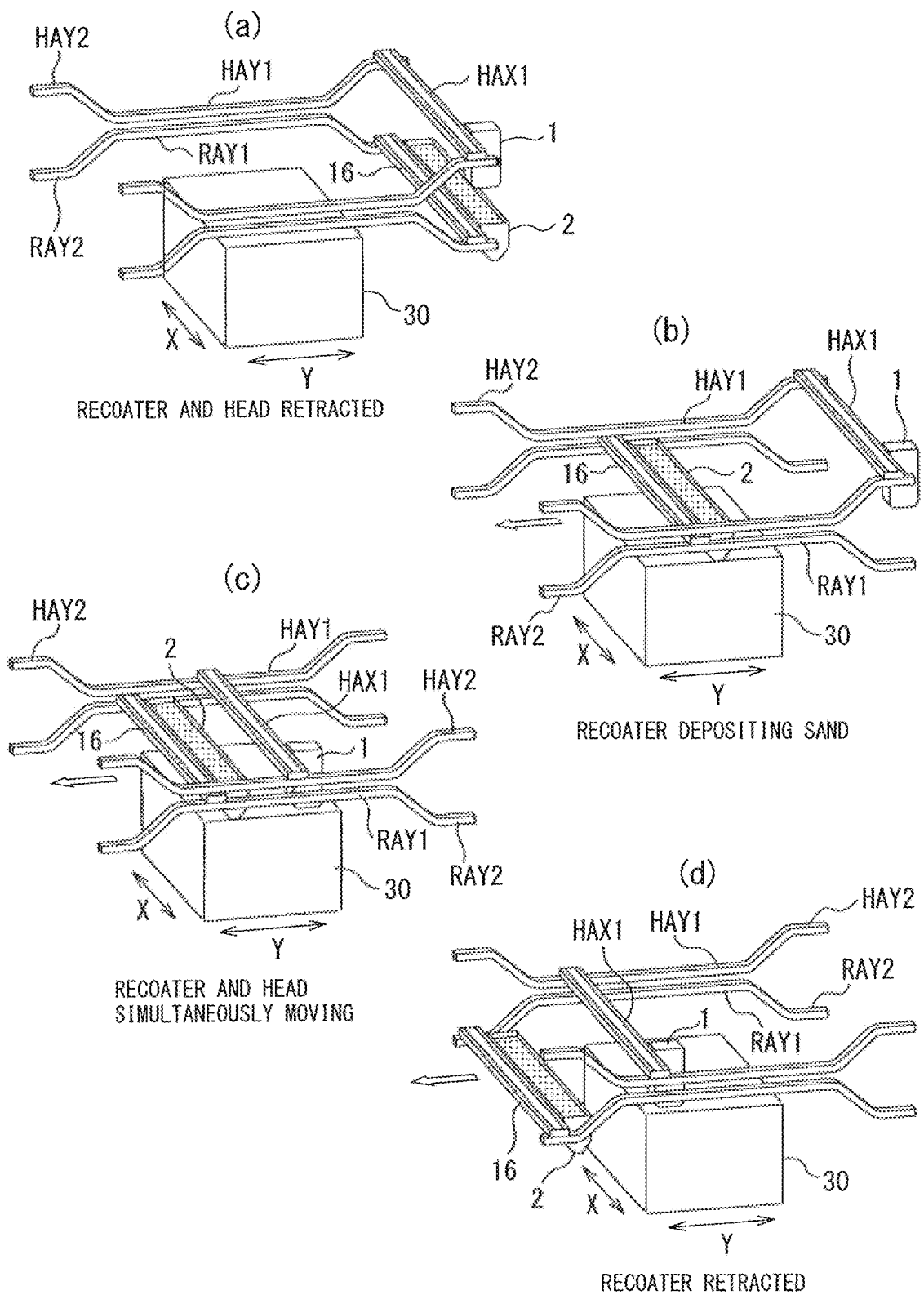
FIG. 10(a) is a view showing the state where the ink jet head and recoater are in retracted positions.
FIG. 10(b) is a perspective view showing the state where the recoater moves and deposits sand from the state shown. in FIG. 10(a)
FIG. 10(c) is a perspective view showing the state where the ink jet head operates following the recoater from the state shown in FIG. 10(b)
FIG. 10(d) is a perspective view showing the state where the recoater finishes the sand depositing operation and enters the retracted position and where the ink jet head moves and discharges and coats the binder.

FIG. 9(*d*) is a perspective view showing the state where the recoater 2 finishes the sand depositing operation and enters a retracted position, and the head 1 moves and discharges and coats binder on the sand. Further, when the head 1 finishes discharging and coating binder, the head 1 also enters a retracted position. The above is the operation of the recoater 2 depositing a first layer of sand on the printing table 30 and the head 1 discharging and coating binder on the first layer of sand in the forward path. The recoater 2 can deposit sand on the printing table 30 in the forward and return operations. Similarly, the head 1 can also discharge and coat binder on the sand in the forward and return operations. FIG. 10(*a*) to FIG. 10(*d*) show the operation at the return path of the head 1 and recoater 2.

FIG. 10(*a*) shows the state where the head 1 and the recoater 2 are at retracted positions. Further, FIG. 10(*b*) shows the state where the recoater 2 moves from the state shown in FIG. 10(*a*) and deposits sand on the printing table 30. The head 1 is at a retracted position. FIG, 10(c) shows the state where the head 1 moves following the recoater 2 from the state shown in FIG. 10(*b*) and is the same as the state explained in FIG. 9(*c*). FIG. 10(*d*) shows the state where the recoater 2 has finished the sand depositing operation and enters a retracted position and the head 1 is moving and discharging and coating a binder. After that, the head 1 and the recoater 2 return to the state shown in FIG. 9(*a*). After that, the operation shown from FIG. 9(*a*) to FIG. 10(*d*) is repeated.

In this way, in the movement structure of the head 1 and recoater 2 of the 3D printer in the second embodiment, the head 1 can be made to move to coat binder on the deposited sand in the middle of the sand depositing operation of the recoater 2, so it is possible to form a 3D object on the printing table 30 in a short time. Note that in general the speed of movement of the head 1 is faster than the speed of movement of the recoater 2, but while the head 1 operates in the Y-direction at set intervals from the end of operation in the X-direction, the recoater 2 need only operate in the Y-direction, so up to what position the recoater 2 should be moved when starting the operation of the head 1 may be determined in accordance with the respective speeds of movement.

Figure 12:
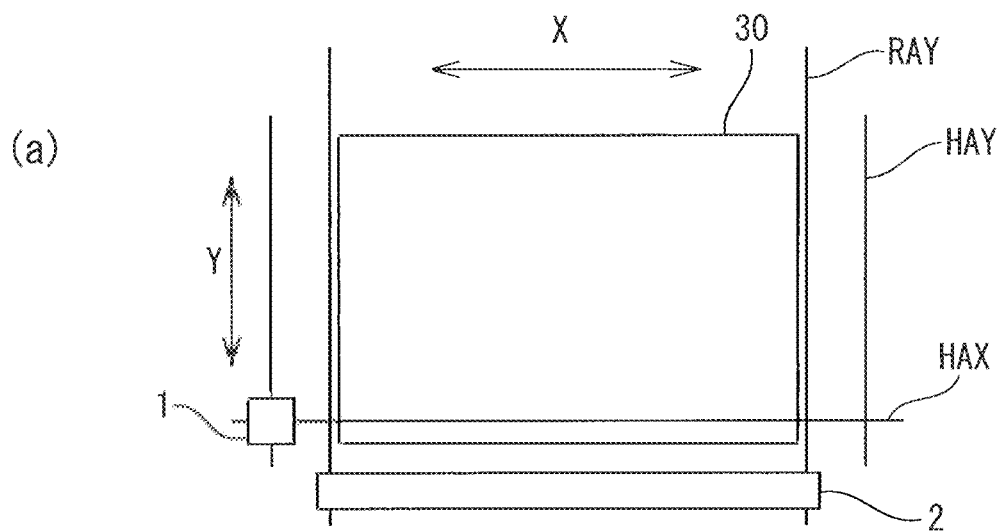
FIG. 12(a) is a plan view showing the structure of the movement mechanism of the ink jet head and the recoater in a third embodiment of the 3D printer of the present invention in a simplified manner and is a view showing the state where the ink jet head and the recoater are in retracted positions.
FIG. 12(b) is a plan view showing the state where the recoater moves from the state shown in FIG. 12(a) and performs a sand depositing operation and the ink jet head operates following the recoater.
FIG. 12(c) is a plan view showing the state where the recoater finishes the sand depositing operation and enters a retracted position and where the ink let head also finishes the binder discharge and coating operation and enters a retracted position from the state shown in FIG. 12(b).
Figure 12:
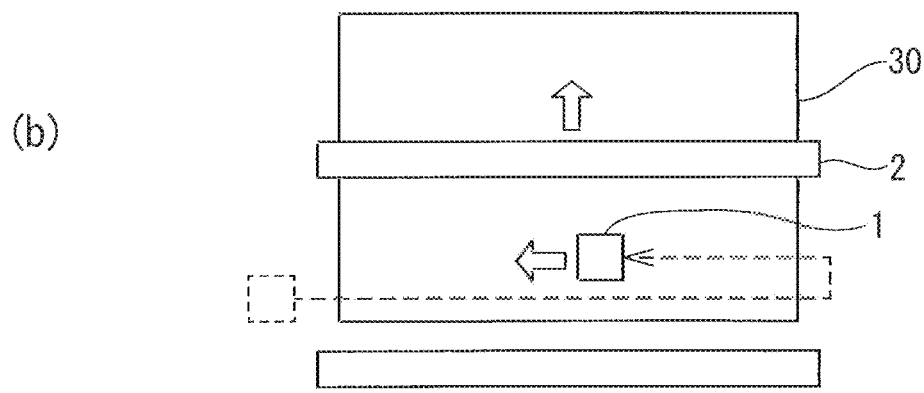
Figure 12:
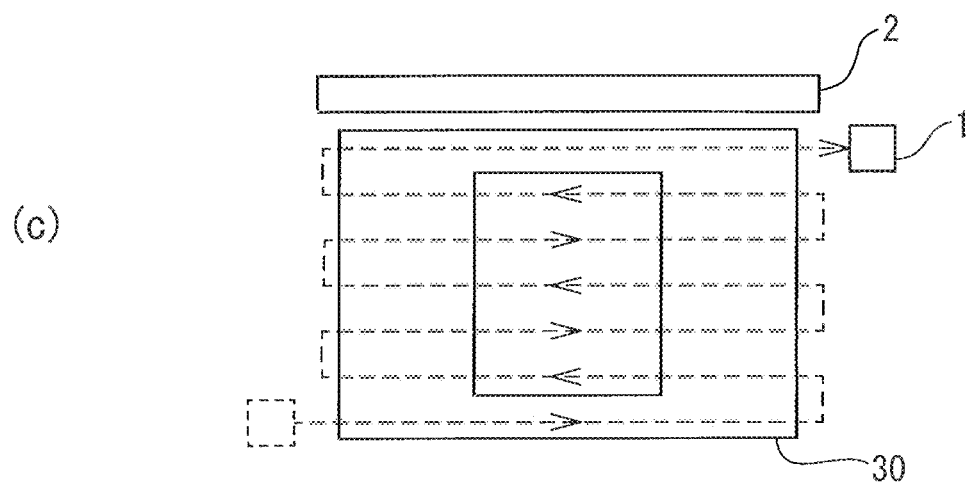

FIG. 12(*a*) shows the structure of the movement mechanism of the head 1 and the recoater 2 in a third embodiment of the present invention in a simplified manner and shows the state where the head 1 and the recoater 2 are in retracted positions. In the third embodiment as well, the other parts besides the movement mechanism of the head 1 and the recoater 2 may be configured the same as the configuration of the general 3D printer 10 explained in FIG. 1(*a*), so illustrations and explanations will be omitted.

In the third embodiment, the direction of one side of the printing table 30 forming the 3D object is made the X-direction while the direction of an adjoining side is made the Y-direction. In the third embodiment, two recoater Y-axis rails RAY are provided parallel to the Y-direction. The two recoater Y-axis rails RAY extend to the two sides of the printing table 30 and are provided with parts for retraction of the recoater 2. Between the two recoater Y-axis rails RAY, a recoater 2 provided with a length of one side of the printing table 30 is attached. The recoater Y-axis rails RAY are simplified and shown by straight lines. Illustration of a mounting bar for mounting the recoater 2 is omitted. For the recoater 2, one the same as the recoater 2 in the general 3D printer 10 explained in FIG. 1(*a*) can be used.

At the outside of the two recoater. Y-axis rails RAY, two head Y-axis rails HAY are provided in parallel. The interval between the two head. Y-axis rails HAY is broad so as not to interfere with the recoater 2 moving over the two recoater Y-axis rails RAY. Between the two head Y-axis rails HAY, a head. X-axis rail HAY able to move along the head Y-axis rails HAY in the Y-direction is bridged. At the head Y-axis rail HAY, a head 1 is attached to be able to move in the X-direct ion, For the head 1, one the same as the head 1 in the general 3D printer 10 explained in FIG. 1(*a*) can be used.

By making the head X-axis rail HAY able to move along the head Y-axis rails HAY in the Y-direction and making the head 1 able to move along the head X-axis rail HAX in the X-direction, the head 1 can freely move over the entire top surface 305 of the printing table 30 to discharge and coat the binder. As explained above, the head 1 in the retracted state and the recoater 2 in the retracted state do not interfere with each other.

When forming a 3D object on the top surface 305 of the printing table 30, the recoater 2 at the retracted position shown in FIG. 12(*a*) first moves and. deposits sand on the printing table 30. In the third embodiment as well, after the recoater 2 deposits a certain amount of sand on the printing table 30 and before the recoater 2 finishes depositing the sand, the head 1 moves following the recoater 2 and starts operating to discharge and coat binder on the sand deposited by the recoater 2.

FIG. 12(*b*) shows the state in the third embodiment where in the middle of the recoater 2 moving and depositing sand, the head 1 follows the recoater 2 and discharges and coats binder on the sand. The head 1 discharges and coats binder on the sand deposited by recoater 2 moving in the Y-direction of the printing table 30. The operation where the head 1 first moves over the printing table 30 in the X-direction to discharge binder, coats the binder in the X-direction, then moves in the Y-direction and again moves in the X-direction to discharge and coat binder is repeated. When the head 1 has only one binder nozzle, the head 1 moves in the Y-direction one line at a time, but when the head 1 is provided with a plurality of binder nozzles in the Y-direction, the head 1 may move in the Y-direction by several lines at a time.

FIG. 12(*c*) shows the state where the recoater 2 finishes the sand depositing operation and enters a retracted position and the head 1 finishes the operation of discharging and coating binder on the sand and enters a retracted position. The above is the operation where the recoater 2 deposits a first layer of sand on the printing table 30 and the head 1 discharges and coats binder on the first layer of sand. The recoater 2 can deposit sand on the printing table 30 in forward and return operations and similarly the head 1 discharges and coats binder on the sand in the forward and return operations. For this reason, while illustration is omitted, it is possible to perform an operation where the recoater 2 again moves in the Y-direction from the position shown in FIG. 12(c) to deposit sand on the printing table 30, then the head. 1 follows the recoater 2 and discharges and coats binder on the sand deposited by the recoater 2.

As described above, even with the movement structure of the head 1 and the recoater 2 of the 3D printer in the third embodiment, in the middle of the sand depositing operation of the recoater 2, it is possible to make the head 1 move and coat binder on the sand deposited, so it is possible to form a 3D object on the printing table 30 in a short time. As explained above, in general, the speed of movement of the head 1 is faster than the speed of movement of the recoater 2, but while the head 1 operates in the Y-direction at set intervals from the end of operation in the X-direction, the recoater 2 need only operate in the Y-direction, so up to what position the recoater 2 should be moved when starting the operation of the head 1 may be determined in accordance with the respective speeds of movement.

REFERENCE SIGNS LIST 1, 1L: ink let heads (heads)
2: recoater
3: printing tank
4: elevator
10: 3D printer
30: printing table
HAX, HAX1: head X-axis rails
HAY, HAY1: head Y-axis rails
RAY, RAY1: recoater rails
HAY2, RAY2: offset rails
S: sand

The invention claimed is:

1. A 3D printer to create a 3D object on a printing table by depositing powder material on it to form layers and discharging a binder on the on the deposited powder material layer by layer, comprising:
   a recoater whose length is as long as the length of one side of the printing table and is configured to deposit powder material on said printing table at both of forward and return operations with respect to the one side,
   a controller in which printing data is stored; and
   an ink jet head whose length is as long as the length of the other side of the printing table adjoining the one side of the printing table and is configured to move in a direction perpendicular to the movement of the recoater in order to discharge and coat binder on the powder material based on the printing data,
   wherein the 3D printer is configured to perform the following operations by the controller:
   the ink jet head is configured to discharge and coat binder on the deposited powder material after the deposition operation of the recoater in one direction has ended; and
   then a depositing operation of powder material by the recoater and a discharge and coating operation of binder by the ink jet head are alternately performed until the 3D object is formed.

2. A 3D printer to create a 3D object on a printing table by depositing powder material on it to form layers and discharging a binder on the deposited powder material layer by layer, comprising:
   a recoater whose length is as long as the length of one side of the printing table and is able to deposit powder material on the printing table at both forward and return movements with respect to the one side,
   a controller in which printing data is stored;
   an ink jet head which is configured to freely move in longitudinal and lateral directions of the printing table in order to discharge and coat binder on the deposited powder material based on the printing data;
   a pair of recoater rails for moving the recoater above the printing table, each equipped with a parallel portion for moving the recoater in forward and return directions and extended portions extending from both ends of the parallel portion toward the outside of the printing table respectively, wherein the extended portions are configured to retract the recoater without interfering with the ink jet head;
   a first head rail for moving the ink jet head in a direction perpendicular to the moving direction of the recoater;
   a pair of second head rails for movably holding the both ends of the first head rail, each equipped with a parallel portion position for moving the first head rail in forward and return directions and extended portions extending from both ends of the parallel portion toward the outside of the printing table respectively, wherein the extended portions are configured to retract the ink jet head moveable on the first head rail without interfering with the recoater;
   wherein the 3D printer is configured to perform the following operations by the controller:
   the first head rail is configured to move along the pair of second head rails following the movement of the recoater during the depositing operation of powder material on the printing table by the recoater;
   the ink jet head is configured to move along the first head rail to discharge and coat binder on the deposited powder material during the movement of the first head rail;
   the recoater is configured to retract at the extended portion of the recoater rail after deposition of powder material on the printing table, and
   the recoater is configured to resume deposition of powder material on the printing table after confirming that the first head rail and the ink jet head have entered the extended portion of the second head rails.

3. A 3D printer according to claim 2, wherein the ink jet head is configured so as to discharge and coat binder on one line of the deposited powder material after the deposition of the one line of powder material by the recoater.

4. A 3D printer according to claim 2, wherein the ink jet head is configured so as to discharge and coat binder on a plurality of lines of the deposited powder material after the deposition of the plurality of lines of powder material by the recoater.

* * * * *